(12) United States Patent
Wong et al.

(10) Patent No.: US 11,144,851 B2
(45) Date of Patent: Oct. 12, 2021

(54) SYSTEM AND METHODS FOR MANAGING COMMUNICATIONS EVENTS

(71) Applicant: TEXTNOW, INC., Waterloo (CA)

(72) Inventors: U Kong Wong, San Francisco, CA (US); Chen Chen, San Francisco, CA (US)

(73) Assignee: TEXTNOW, INC., Waterloo (CA)

(*) Notice: Subject to any disclaimer, the term of this patent is extended or adjusted under 35 U.S.C. 154(b) by 240 days.

(21) Appl. No.: 16/539,234

(22) Filed: Aug. 13, 2019

(65) Prior Publication Data

US 2020/0050979 A1    Feb. 13, 2020

Related U.S. Application Data

(60) Provisional application No. 62/718,123, filed on Aug. 13, 2018.

(51) Int. Cl.
*G06Q 30/02* (2012.01)
*G06Q 10/04* (2012.01)
*H04M 7/00* (2006.01)

(52) U.S. Cl.
CPC ......... *G06Q 10/04* (2013.01); *G06Q 30/0206* (2013.01); *G06Q 30/0271* (2013.01); *H04M 7/0075* (2013.01); *H04M 7/0078* (2013.01)

(58) Field of Classification Search
USPC ....................................................... 705/14.1
See application file for complete search history.

(56) References Cited

PUBLICATIONS

Fader, Peter S., and Bruce GS Hardie. "The Gamma-Gamma model of monetary value." (2013). Available at: http://brucehardie.com/notes/025/.

*Primary Examiner* — Afaf Osman Bilal Ahmed
(74) *Attorney, Agent, or Firm* — Perry + Currier Inc.

(57) ABSTRACT

An example communications routing system includes a prediction engine to, for each user account, generate a predicted cost of communications events using a gamma-gamma cost model, generate a predicted revenue of presented advertisements using a gamma-gamma revenue model, generate a margin based on the predicted cost and the predicted revenue, and, when the margin for a given user account is below a margin threshold, restrict a status associated with the given user account.

14 Claims, 5 Drawing Sheets

SYSTEM AND METHODS FOR MANAGING COMMUNICATIONS EVENTS

FIELD

The present invention relates to electronic communications and in particular to managing communications events provided by an electronic communications service to increase profitability margins.

BACKGROUND

A telephone network operator ("Carrier") is a communications services provider that may have a fixed and/or wireless network infrastructure to provide communications services to its customers. A Carrier may utilize a combination of any number of technologies including those wireless technologies provided by any number of mobile network providers (such as cellular, LTE™) and those provided by any number of consumer establishments where Wi-Fi®, and the like, may be freely available to customers for Internet access. For the most part, Carriers are for-profit entities providing a communications service to the general public.

A Carrier may use Voice over Internet Protocol (VoIP) which is a technology that provides voice communications services and data communications services (e.g., multimedia sessions) over Internet Protocol (IP) networks, such as the Internet and/or private packet networks. Typically, a software telephony application using VoIP which can be installed on various devices such as handheld devices with Android or iOS operating systems, and desktop or laptop computers with Windows or Linux operating systems, for example. Further, VoIP technologies have evolved to include a telephone number for users and which include Short Message Service (SMS) for text messaging services.

These software telephony applications may be installed on mobile devices as well as fixed (hard-wired desktop) computers. A single user may have a number of fixed computers and mobile devices where the software telephony application is installed. Some of these telephony applications provide "free" access to an electronic communications service for communications service. The "free" telephony applications from for-profit entities tend to be supported by advertising placements in the applications. These applications have a need to restrict particular users, and/or to place more advertisements to those users, who excessively use the service.

It may be advantageous to improve the communication services using restrictive measure such as by removing (blocking) users from access, and/or enhancing advertising placements to users, based on the profitability margins of the users.

SUMMARY

According to one aspect of the present invention, there is provided a communications routing system comprising: a routing engine configured to manage Voice over Internet Protocol (VoIP) communications events between a plurality of communications devices using respective VoIP telephone numbers; an account database storing a plurality of unique associations between user accounts of users and the VoIP telephone numbers; a cost database storing a cost of the communications events for the user accounts; a revenue database storing a revenue of presented advertisements associated with the user accounts; a prediction engine configured to, for each of the user accounts: generate a predicted cost of the communications events using a gamma-gamma cost model; generate a predicted revenue of the presented advertisements using a gamma-gamma revenue model; generate a margin based on the predicted cost and the predicted revenue; and when the margin for a given user account is below a margin threshold, restrict a status associated with the given user account.

According to another aspect, to generate the predicted revenue for the given user account, the prediction engine is configured to: determine optimal parameters of the gamma-gamma revenue model based on a maximum likelihood estimation; and determine a predictive revenue distribution for the given user account using an inverse gamma revenue distribution based on (i) the optimal parameters, (ii) an average daily advertisement revenue for the given user account and (iii) a number of days on which the given user account was presented with an advertisement.

According to another aspect, to generate the predicted cost for the given user account, the prediction engine is configured to: determine optimal parameters of the gamma-gamma cost model based on a maximum likelihood estimation; and determine a predictive cost distribution for the given user using an inverse gamma distribution based on (i) the optimal parameters, (ii) an average daily cost of communications events for the given user account and (iii) a number of days on which a communications event occurs for given user account.

According to another aspect, in response to restricting the status of the given user account the routing engine is configured to: block communications events for the given user account; limit features of communications services available for the given user account; increase a length of advertisements presented to the given user account; or increase a number of advertisements presented to the given user account.

According to another aspect, the prediction engine is further configured to: determine an upper revenue confidence bound representing a revenue threshold percentile of an inverse gamma revenue distribution; determine a lower cost confidence bound representing a cost threshold percentile of an inverse gamma cost distribution; and generate the margin based on the difference between the upper revenue confidence bound and the lower cost confidence bound.

According to another aspect, the revenue threshold percentile is the $95^{th}$ percentile.

According to another aspect, the cost threshold percentile is the $5^{th}$ percentile.

According to another aspect, the prediction engine is configured to update the account database to include an indication of the restricted status of the given user account.

According to one aspect of the present invention, a method includes storing a plurality of unique associations between user accounts of users and the VoIP telephone numbers; storing a cost of the communications events for the user accounts; storing a revenue of presented advertisements associated with the user accounts; for each of the user accounts: generating a predicted cost of the communications events using a gamma-gamma cost model; generating a predicted revenue of the presented advertisements using a gamma-gamma revenue model; generating a margin based on the predicted cost and the predicted revenue; and when the margin for a given user account is below a margin threshold, restricting a status associated with the given user account.

According to another aspect, generating the predicted revenue for the given user account comprises: determining optimal parameters of the gamma-gamma revenue model based on a maximum likelihood estimation; and determining a predictive revenue distribution for the given user account using an inverse gamma revenue distribution based on (i) the optimal parameters, (ii) an average daily advertisement revenue for the given user account and (iii) a number of days on which the given user account was presented with an advertisement.

According to another aspect, generating the predicted cost for the given user account comprises: determining optimal parameters of the gamma-gamma cost model based on a maximum likelihood estimation; and determining a predictive cost distribution for the given user using an inverse gamma distribution based on (i) the optimal parameters, (ii) an average daily cost of communications events for the given user account and (iii) a number of days on which a communications event occurs for given user account.

According to another aspect, in response to restricting the status of the given user account: blocking communications events for the given user account; limiting features of communications services available for the given user account; increasing a length of advertisements presented to the given user account; or increasing a number of advertisements presented to the given user account.

According to another aspect, the method further comprises determining an upper revenue confidence bound representing a revenue threshold percentile of an inverse gamma revenue distribution; determining a lower cost confidence bound representing a cost threshold percentile of an inverse gamma cost distribution; and generating the margin based on the difference between the upper revenue confidence bound and the lower cost confidence bound.

According to another aspect, the revenue threshold percentile is the $95^{th}$ percentile.

According to another aspect, the cost threshold percentile is the $5^{th}$ percentile.

According to another aspect, the method further comprises updating the account database to include an indication of the restricted status of the given user account.

According to one aspect of the present invention, a communications system includes: a mobile network to provide mobile communications services for a plurality of mobile communications devices over a wide-area IP network; a wireless local-area network (WLAN) to provide wireless network communications services for a plurality of communications devices over the wide-area IP network; a Voice over Internet Protocol (VoIP) service coupled to the mobile network and the WLAN via the wide-area IP network to provide VoIP communications services for the plurality of communications devices; a public switched telephone network (PSTN) coupled to the VoIP service; a communications routing system coupled to the plurality of communications devices via the wide-area IP network to manage Voice over Internet Protocol (VoIP) communications events between a plurality of communications devices using respective VoIP telephone numbers; an account database storing a plurality of unique associations between user accounts of users and the VoIP telephone numbers; a cost database storing a cost of the communications events for the user accounts; a revenue database storing a revenue of presented advertisements associated with the user accounts; a prediction engine configured to, for each of the user accounts: generate a predicted cost of the communications events using a gamma-gamma cost model; generate a predicted revenue of the presented advertisements using a gamma-gamma revenue model; generate a margin based on the predicted cost and the predicted revenue; and when the margin for a given user account is below a margin threshold, restrict a status associated with the given user account.

BRIEF DESCRIPTION OF THE DRAWINGS

The drawings illustrate, by way of example only, implementations of the present invention.

DETAILED DESCRIPTION

The present invention generally relates to an electronic communications system providing electronic communications services (e.g., voice telephone calls, short message service or SMS messages, text-image-video-audio messages, general data communications, etc.). The system, for example, includes a quality of service and having VoIP telephone numbers where each VoIP telephone number is associated with one or more communication devices. While certain infrastructure may not operate under Internet Protocol (IP) (e.g., PSTNs, cellular base station networks, etc.), communications are routed to and from such infrastructure using IP to the extent possible. The present invention also generally relates to providing communications services to communication devices where the communication devices (of the users) having low (or below a threshold) profitability margins have restrictive measures applied (such as being removed (blocked) from accessing the communications services); and/or have enhancement measures being applied (such as more advertising placements). Other aspects of the present invention will also become apparent in light of the following detailed description.

Figure 1:
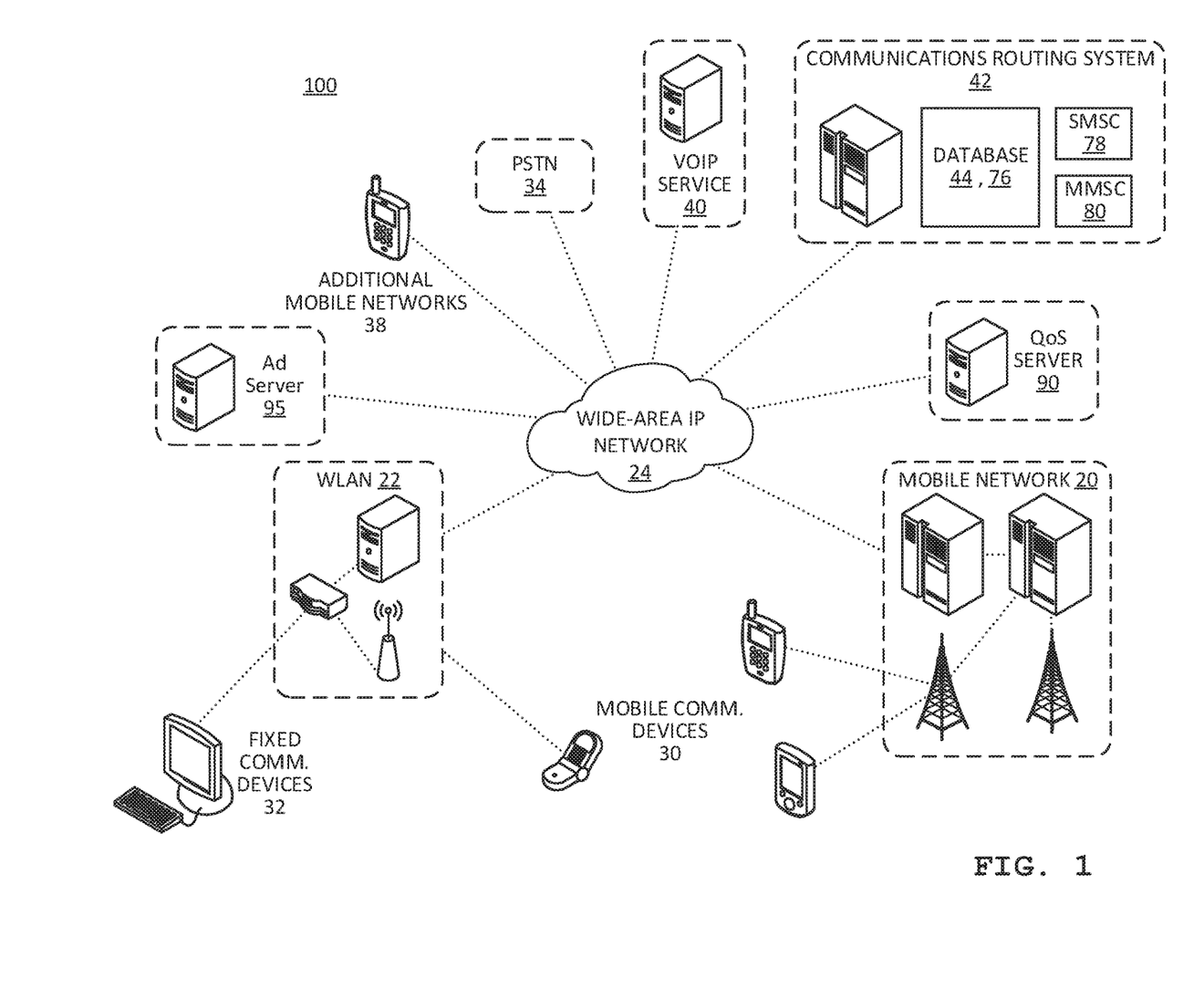
FIG. 1 is a block diagram of a communications system which provides communications services and utilizes gamma-gamma distribution analysis to manage communications events.

FIG. 1 shows a block diagram of a communications system 100 which provides communications services and utilizes gamma-gamma distribution analysis to manage communications events.

The communications system 100 includes a mobile network 20, such as a wireless cellular network that operates under one or more known standards and technologies, such as Long Term Evolution (LTE), Worldwide Interoperability for Microwave Access (WiMAX), Enhanced Voice-Data Optimized (EVDO), Code Division Multiple Access (CDMA), HSPA (High Speed Packet Access), and similar. The mobile network 20 provides mobile network communications services, such as voice, data, and SMS services.

The communications system 100 further includes at least one wireless local-area network (WLAN) 22 that operates under one or more known standards and technologies, such as IEEE 802.11.

The mobile network 20 and the WLAN 22 each connect to a wide-area IP network 24, such as the Internet. The WLAN 22 can be connected to the wide-area IP network 24 by an Internet service provider (ISP) or the similar entity (not shown). The mobile network 20 can be connected to the wide-area IP network 24 by a packet data interface.

The communications system 100 can further include a push notification service, such as the kind operated by Google Inc. of Mountain View, Calif., and Apple Inc. of Cupertino, Calif.

A plurality of mobile communications devices 30 can connect to the mobile network 20, via base stations and other infrastructure, and can further connect to the WLAN 22, via access points or similar. The WLAN 22 thus provides wireless network communication services. Examples of suitable mobile communications devices 30 include devices such as cellular telephones, smartphones, tablet computers, and the like that are provided with wireless communications interfaces suitable for the particular technologies used in the mobile network 20 and the WLAN 22. For sake of discussion it is assumed that all of the mobile communications devices 30 can connect to the mobile network 20 and WLAN 22. In various implementations, different mobile communications devices have different types of wireless communications interfaces, different configurations, and/or different access rights suitable for connection to different mobile networks and different WLANs.

For clarity of illustration, while FIG. 1 has lines showing communication between certain parts of the communications system 100, all of the parts (such as WLAN 22 via ISP and/or mobile network 20) connecting to the wide-area IP network 24 may be configured to communicate with each other. Further, some parts of the communications system 100 are not shown to enhance clarity, for example, the communications of a Push Notification Service (not shown) with the plurality of mobile communications devices 30 via the mobile network 20 or the WLAN 22.

One or more stationary (fixed) communications devices 32, such as a desktop computer, laptop or wi-fi only device, server, or similar, can also connect to the WLAN 22, via a router or wired access point. For clarity, the term communications devices 30, 32 means mobile communications devices 30 and fixed communications devices 32.

The communications system 100 can further be connected to a public switched telephone networks (PSTN) 34 that supports connecting to a plurality of landline telephones and additional mobile networks 38. The additional mobile networks 38 may have the same or similar features of the mobile network 20 and may be operated by different carriers and/or operated according to different technologies and standards when compared to the mobile network 20. For clarity, the mobile communications devices 30 connected to the mobile network 20 may also initiate to or receive voice calls directly from the PSTN 34 (which includes additional mobile networks 38) via the mobile network 20. Further, such voice calls, for example, may be via GSM (Global System for Mobile communication) from the mobile network 20. For convenience, such voice calls via the mobile network 20 in this disclosure are referred to as via a "voice channel". This is in contrast to VoIP voice calls using a "data channel" of the mobile network 20 such as the Packet Data Channel of GPRS (General Packet Radio Service).

The communications system 100 further includes at least one voice-over-IP (VoIP) service 40, which can be configured to manage IP data streams related to VoIP communications services (for example routing the IP data steam from communications device 30, 32 to another communications device 30, 32). All VoIP calls are steamed through the VoIP service 40. It also interfaces (transcoding as necessary) with the PSTN 34 and the additional mobile networks 38.

The VoIP service 40 may operate using one or more protocols, such as the Session Initiation Protocol (SIP), and one or more audio codecs, such as Opus. The VoIP service 40 can be connected to the PSTN 34 to allow VoIP calls to be place to and from landlines and wireless devices in the additional mobile networks 38. One of the functions of the VoIP service 40 is to transcode the IP data streams so that it is compatible between different networks (for example between the mobile network 20 and the PSTN 34). In some implementations, the VoIP service 40 is a subcomponent of the mobile network 20 or the additional mobile networks 38.

The communications system 100 further includes a communications routing system 42 connected to the VoIP service 40, the push notification service, and the mobile network 20 via the wide-area IP network 24. In some implementations, the VoIP service 40 is directly connected to the communications routing system 42 via a local IP network distinct from the wide-area IP network 24. The communications routing system 42 is configured to direct the routing of communications of disparate types between mobile communications devices 30 via the mobile network 20 and/or the WLAN 22, and further with communications devices (including landlines) of the PSTN 34 and the additional mobile networks 38 as needed.

The communications system 100 can further include a proxy (not shown) connected to the communications routing system 42, the WLAN 22, and the mobile network 20 via the wide-area IP network 24. In some implementations, the communications routing system 42 and the mobile communications devices 30 can be configured to route communications events through the proxy. The proxy can be configured to handle VoIP call handoffs, as an alternative to the communications routing system 42 handling such. In addition, the proxy can be configured to prioritize communications events associated with the enhanced 911 system, as an alternative to the communications routing system 42 doing so. For example, the proxy can control quality of service (QoS) settings for various communications, so that 911 calls are prioritized. In some implementations, the VoIP service 40 is configured to route all relevant VoIP data through the proxy. A suitable proxy service can be in the form of that available from Pravala Networks Inc., of Kitchener, Ontario, Canada.

Figure 2:
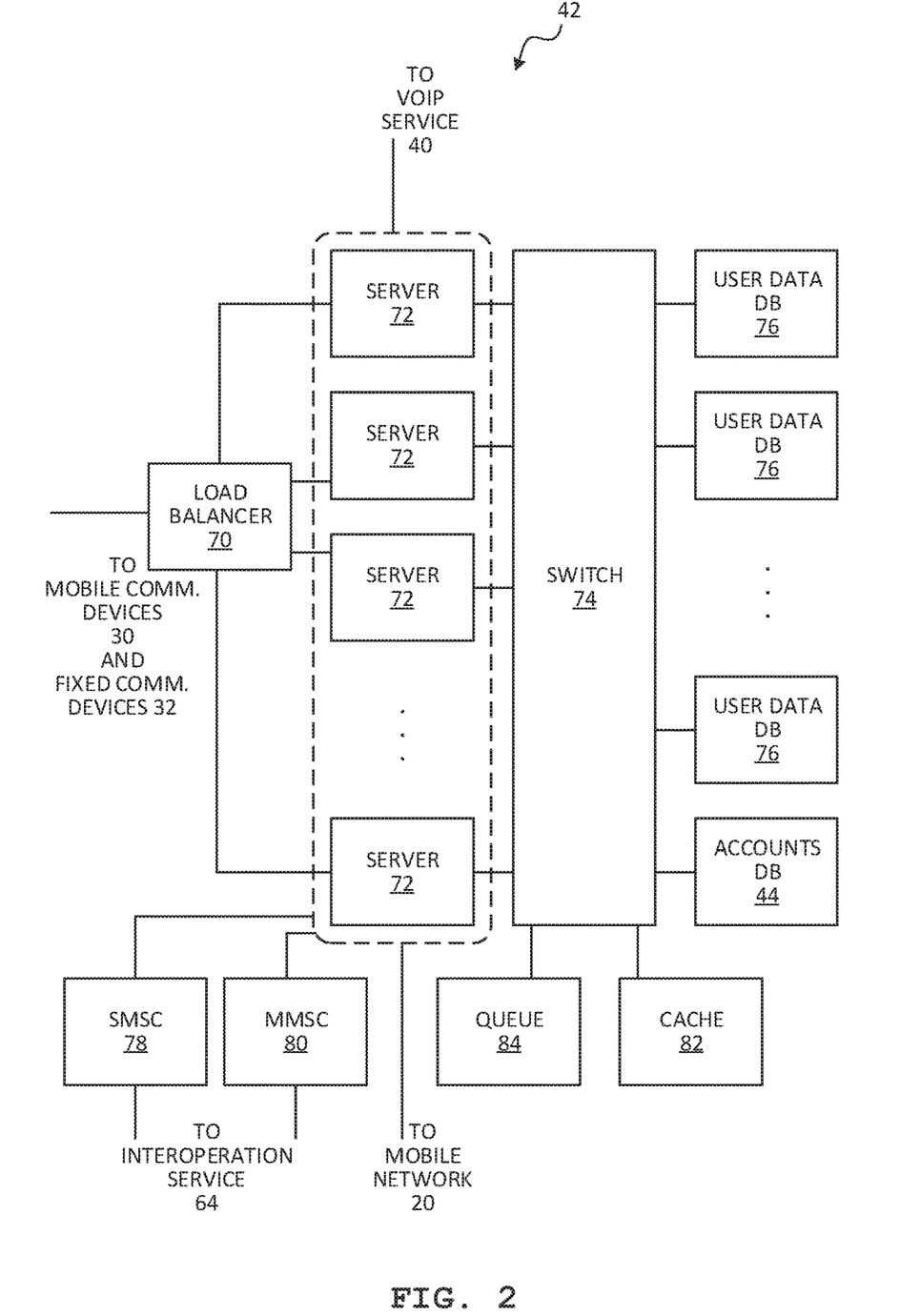
FIG. 2 is a block diagram of a communications routing system in the communications system of FIG. 1.

The communications system 100 can further include an interoperation service 64 (as seen in FIG. 2) connecting the communications routing system 42 to the mobile network 20 via the wide-area IP network 24. The communications routing system 42 can be connected to the interoperation service via a virtual private network (VPN) established over the wide-area IP network 24. The interoperation service is configured to interface with the various mobile networks 20, 38. The interoperation service facilitates data communications between the communications routing system 42 and the mobile network 20. The interoperation service further facilitates messaging services, such as SMS and MMS, between the communications routing system 42 and the additional mobile networks 38. The interoperation service can be the kind provided by Syniverse of Tampa, Fla.

The communications routing system 42 includes at least one database, such as an accounts database 44 and one or more user data databases 76 (see FIG. 2), configured to store a plurality of associations between unique account identifiers (e.g., user names) and device identifiers including mobile-network identifiers supported by the mobile network 20, such as mobile directory numbers (MDNs, or telephone numbers) of the mobile communications devices 30, and fixed identifiers of the fixed communications devices 32. For each user name, the database 44, 76 can store associations with a number of communications devices 30, 32. A user may have one or more fixed communications devices 32 and/or one or more mobile communications devices 30. For some embodiments, a mobile device, such as a laptop or tablet, with only WLAN 22 capabilities can be treated as fixed communications devices 32.

One mobile communications device 30 can have a first MDN for SMS/MMS messages and VoIP calls, and a second MDN for services on the mobile network 20. The first and second MDNs are district and mutually different. The first MDN is used at the VoIP service 40 and the communications routing system 42 for VoIP calls. The first MDN is also used at the interoperation service and communications routing system 42 for communicating SMS/MMS messages. In some implementations, the first MDNs are landline telephone numbers obtained from at least one competitive local exchange carrier (CLEC). The second MDN is used by the mobile network 20 to track data usage by each respective mobile communication device 30, with the communications routing system 42 using the second MDNs to map data usage to particular accounts. The database 44, 76 may further store push tokens to identify mobile communications devices 30 via the push notification service, so that the communications routing system 42 can send push notifications to the mobile communications devices 30. Alternately or additionally, the database 44, 76 may store currently assigned IP addresses for the communications devices 30, 32.

In some embodiments, only the first (VoIP) MDN is used and the first MDN is registered with the mobile network 20 for data usage at the mobile network 20. For such embodiments, functionality described herein described with respect to the second (mobile network) MDN is performed using the first (VoIP) MDN.

In other embodiments, a VoIP telephone number is associated with each user name which is distinct from the MDNs of the one or more mobile communication devices 30 of the user. The IP addresses of the communications devices 30, 32 may be obtained when the communications devices 30, 32 contacts the communications routing system 42.

The communications routing system 42 further includes a routing engine responsive to incoming communications events. Incoming communications events can include initiation of voice calls, ending of voice calls, communication of SMS/MMS messages, requests for data. The routing engine is further configured to route data communications with the plurality of mobile communications devices 30 over the mobile network 20 and the WLAN 22 using the Internet, as well as with the plurality of fixed communications devices 32 over the WLAN 22 using the Internet. The routing engine is further configured to initiate and end voice calls with communications devices 30, 32 as VoIP calls using the VoIP server 40, and to communicate SMS messages with the plurality of mobile communications devices 30 via the mobile network 20 and the WLAN 22 using the Internet, as well as with the plurality of fixed communications devices 32 over the WLAN 22 using the Internet.

The communications routing system 42 can further include a short message service center (SMSC) 78 and a multimedia message service center (MMSC) 80 configured to store, forward, convert and deliver SMS and MMS messages between the communications routing system 42 and the interoperation service. The SMSC 78 and MMSC 80 can be configured to communicate with the interoperation service using the Short Message Peer-to-Peer (SMPP) protocol.

Each mobile communications device 30 and fixed communications device 32 can be associated with one of the unique account identifiers (e.g., user names) stored in the database 44, 76. This can be achieved by, for example, a client program executed on the mobile communications device 30 requiring a user log in. When a user is logged in to the client program, for example, the mobile communications device 30 becomes associated with the respective unique account identifier.

Each account identifier can be associated with a plurality of mobile communications devices 30, and each of the mobile communications devices 30 can be associated with a first mobile-network identifier, such as a first MDN that is associated with the VoIP service 40. Each account identifier can be associated with a second mobile-network identifier, such as a second MDN that is associated with mobile data access on the mobile network 20. In some implementations, the second MDN is only associated with mobile data access on the mobile network 20 to the exclusion of access to circuit-switched voice services and SMS/MMS services that may be available on the mobile network 20. The mobile network 20 uses the second MDN to track data usage of the mobile communications device 30, which can be reported to the communications routing system 42. Hence, for each account identifier, voice services via the VoIP server 40 are conducted with one MDN and data services are conducted via the mobile network using a different MDN. The communications routing system 42 maps each MDN to a particular account for managing overall services to that account identifier.

An outgoing voice call from a communications device 30, 32 is conducted as follows. The communications device 30, 32 sends a call request to the VoIP service 40 via the WLAN 22, if connected, or otherwise via the mobile network 20. The communications device 30, 32 registers with the VoIP service 40 if not already registered. If the destination device is on the PSTN 34, the VoIP service 40 completes the call via the PSTN 34. If the destination device has an account with the communications routing system 42, then the VoIP service 40 notifies the communications routing system 42 of the call request. The communications routing system 42 then issues a push notification to the destination device (if connected via mobile network 20, through the push notification service) to notify the destination device of the call. Then the destination device registers with the VoIP service 40, if not already registered, and notifies the VoIP service 40 of call acceptance. The VoIP service 40 can notify the communications routing system 42 of call initiation and ending. When the proxy is used, VoIP voice data is routed through the proxy. The outgoing voice call event is recorded in the associated account data of the account identifier in the communications routing system 42 so that it may be synchronized with the client programs on the other communications devices 30, 32 of the account identifier.

The mobile communications devices 30 can perform SIP registrations in a variety of ways.

For mobile communications devices 30 operating on iOS by Apple Inc., the mobile communication device 30 receiving a push notification does not immediately trigger SIP registration. Rather, the push notification informs the user of the incoming call, via an alert or similar. The user can then respond to the push notification by opening the client program, which then performs the SIP registration.

For mobile communications devices 30 operating on Android by Google Inc., the mobile communication device 30 can be configured to perform a SIP registration in response to receiving a push notification for an incoming call. That is, the SIP registration process can be started before the user has accepted the call.

For some embodiments, incoming voice calls to a VoIP telephone number of the communications devices 30, 32 arrive at the VoIP service 40 via the PSTN 34 (for example). Incoming voice calls may also arrive at the VoIP service 40 via the mobile network 20 or the WLAN 22. The VoIP service 40 notifies the communications routing system 42 of a call request for a particular destination communications device 30, 32. The communications routing system 42 then issues a push notification to all of the destination communications devices 30, 32 (through the push notification service, where connected to the mobile network 20), associated with the VoIP telephone numbers, to notify the destination communications devices 30, 32 of the call.

If the user of the destination communications devices 30, 32 accepts the call on one of the destination communication devices 30, 32, then the destination communications device 30, 32 registers with the VoIP service 40, if not already registered, and notifies the VoIP service 40 of call acceptance. The VoIP service 40 notifies the communications routing system 42 of call initiation and ending.

Incoming and outgoing voice calls made to or from a communications device 30, 32 associated with the communications routing system 42 are made using the VoIP telephone number, which is established at the VoIP service 40. When such a call is conducted as data via the mobile network 20, the second MDN of the relevant mobile communications device 30 is used to track the data usage on the mobile network 20.

In some embodiments, caller ID is based on the VoIP telephone number to the exclusion of the mobile network MDN. That is, the mobile network MDN is for tracking data usage only, and the VoIP telephone number is the basis for outgoing and incoming calls.

An outgoing SMS/MMS message can be sent by a communications device 30, 32 as follows. One or more IP data packets containing the SMS/MMS message are sent from the communications device 30, 32 to the communications routing system 42 via the WLAN 22, if connected, or otherwise via the mobile network 20. The sent data specifies a destination device using an MDN. The communications routing system 42 determines whether the MDN is stored in the database 44, 76 and thus whether the destination device is a communications device 30, 32 associated with the communications routing system 42. If the destination device is a communications device 30, 32 associated with the communications routing system 42, then the communications routing system 42 stores the message and sends a push notification to the destination communications device 30, 32 via the push notification service (if connected via the mobile network 20). When a user at the destination communications device 30, 32 opens an SMS/MMS application/module or performs a similar action, the destination communications device 30, 32 fetches the stored message from the communications routing system 42. If the destination device is not associated with the communications routing system 42, then the communications routing system 42 sends the SMS/MMS message to the destination device via the interoperation service.

Incoming SMS/MMS messages for the communications devices 30, 32 arrive at the communications routing system 42 either directly from other communications devices 30, 32 that have accounts at the communications routing system 42 or via the interoperation service for devices that are not associated with the communications routing system 42. The communications routing system 42 stores a particular SMS/MMS message and sends a push notification to the destination communications device 30, 32. When a user at the destination communications device 30, 32 opens an SMS/MMS application/module or performs a similar action, the destination communications device 30, 32 fetches the stored message from the communications routing system 42.

Incoming and outgoing SMS/MMS messages made to or from a mobile communications device 30 associated with the communications routing system 42 are made using the first MDN. When messages are sent as data through the mobile network 20, the second MDN of the respective mobile communications device 30 is used to track the data usage on the mobile network 20.

Incoming and outgoing SMS/MMS messages are recorded in the associated account data of the account identifier in the communications routing system 42 so that it may be synchronized with the client programs on the other communications devices 30, 32 of the account identifier. In some embodiments, this synchronization occurs as and when the user of the other communication devices 30, 32 accesses the associated client programs when the client programs contacts the communications routing system 42 to synchronize with the incoming and outgoing SMS/MMS messages, the voice call logs, the voice mails, and other such services including an address book of contacts.

Data communications between communications devices 30, 32 and between communications devices 30, 32 and data sources, such as web sites connected to the wide-area IP network 24, are performed via the WLAN 22, if connected, and otherwise via the mobile network 20.

The communications system 100 further comprises a quality of services (QoS) server 90. The QoS server 90 determines the performance of a data channel to a communications device 30, 32 for a voice call. Where the performance of the data channel to a communications device 30, 32 degrades or drops, the QoS server 90 directs the communication routing system 42 to establish a new channel to the communications device 30, 32 to continue the voice call. In the event that all data channels are degraded or terminated, then the QoS server 90 directs the communications routing system 42 to continue the voice call via a voice channel over the PSTN 34 (or mobile network 20) when the mobile communications device 30 is connected to the mobile network 20.

The QoS server 90 is shown as a standalone component in FIG. 1, however, it may be a subcomponent of another component such as the VoIP Service 40 and the communications routing system 42. The QoS server 90 is connected to the wide-area IP network 24 and as such a connection can be made with any of the communications devices 30, 32.

For further clarity, it will be understood that the mobile communications devices 30 may be simultaneously connected to both the mobile network 20 and the WLAN 22. While mobile network 20 may generally provide a better performing data channel then the WLAN 22 for voice calls, the WLAN 22 may provide the data channel free of charge to users.

The communications system 100 further comprises an advertising server 95. The advertising server 95 may interact with advertiser servers (not shown) to obtain advertisements to display at communications devices 30, 32. The advertisements displayed or presented at the communications 30, 32 may also be referred to herein as ad impressions. The advertising server 95 may be operated by one or more intermediaries to increase revenue generated from advertisements.

FIG. 2 shows a diagram of the communications routing system 42. The communications routing system 42 includes a load balancer 70, a plurality of servers 72, a switch 74, a plurality of user data databases 76, a billing system 43, and the accounts database 44. The load balancer 70, servers 72, and switch 74 can be considered a routing engine. Further, one or more of the servers 72 may serve as a prediction engine. However, this is not limiting.

Communications devices 30, 32 connect to the load balancer 70 via the wide-area IP network 24 using a protocol, such as HTTP, HTTPS, or the like. The load balancer 70 is configured to balance requests from the communications devices 30, 32 among the servers 72.

The servers 72 are connected to the load balancer 70. The servers 72 can be configured to interface with the VoIP service 40 and the mobile network 20. The servers 72 can be clones having the same functionality. The servers 72 contain program code configured to interface with application programming interfaces (APIs) provided by the VoIP service 40 and the mobile network 20 and/or provide APIs for use by the VoIP service 40 and the mobile network 20. The servers 72 can be implemented using Nginx, PHP, and similar technology.

The SMSC 78 and the MMSC 80 are connected to the servers 72 and configured to store, forward, convert and deliver SMS and MMS messages between the servers 72 and the interoperation service using, for example, the SMPP protocol and the MM4 protocol. The SMSC 78 and MMSC 80 can be configured to connect to the interoperation service via a suitable binding and through a VPN tunnel. The SMSC 78 and MMSC 80 expose an API to the routing engine, such that the routing engine can use the API to send outgoing SMS/MMS messages. For incoming messages, the SMSC 78 and MMSC 80 are configured to invoke an API of the routing engine to cause the routing engine to store a received message and send a notification of the message to the destination communications device 30, 32.

The switch 74 connects the servers 72 to the user data databases 76, the accounts database 44, a cache 82, and a queue 84.

Generally, the accounts database 44 stores fixed user information associated with each user account, while the user data databases 76 store communications events associated with one of the user accounts in the accounts database 44. For example, the accounts database 44 may store account information such as a password, residential address, contacts (e.g., an address book of contacts), in-app purchases, subscriptions, settings, balance information, and the like. The accounts database 44 may further store the identity of the user data database 76 which stores the user data associated with each account identifier (user account), and can further store the VoIP telephone number for each user. Further, the account information may include a carrier plan (e.g., including billing rates and the like) for each user account.

The user databases 76 may be configured to store communications event histories for all user accounts in the accounts database 44. In particular, a history for a user account may be downloaded to any communications device 30, 32 with which the user logs in (i.e. in association with the particular user account). The communications event data stored in the user databases 76 may include the mobile network MDNs, session ID, call histories, voice mail content, SMS/MMS message transmission histories, SMS/MMS message content, and the like. The communications event data may further include indications of the geographic location of the communications devices 30, 32 when the communications event was recorded. The geographic location may include, but is not limited to, mobile network codes, country codes, mobile country codes, and any other indication of geographic location or area. In particular, the communications event data may include cost data associated with the communications event. For example, when a user makes an international telephone call, a cost for the call can be associated with the communications event. The cost of transmitting and storing image or video data could be substantial due to the size of image or video files. The cost may be calculated from the size of the file, amount bandwidth used, destination of international telephone call, duration of telephone call, and other methods known in the art. Alternatively, an average cost amount for each type of communications events may also be used as an approximation.

In some embodiments, the user data databases 76 may be implemented as database shards. In some embodiments, the databases 44 and 76 may be combined into one database. Further, in some embodiments, there may be overlap in the data stored in the accounts database 44 and the user databases 76.

The user data databases 76 may further store revenue data associated with the display or presentation of advertisements at the communications devices 30, 32. When an advertisement (e.g. an image or a video) is presented at a communications device 30, 32, the revenue from such an advertising event may be recorded by the advertising server 95. A client program on the communications device 30, 32 may also track ad click throughs and further user actions in order to resolve the revenue from the advertising event. Such ad impressions or ad click throughs may result in varying revenue due to factors known in the art. The actual revenue calculations may be complex and further may be delayed due to business factors such as an amount from volume of advertisements over a time period. In some examples, the actual event may not be known at the time of the advertising event, in which case, an average or estimated revenue may be used instead as an approximation.

The user data is stored by the communications routing system 42 so that it may be synchronized with the client programs on the communications devices 30, 32 of the account identifiers (i.e. user accounts). In some embodiments, this user data synchronization occurs as and when the user accesses the client programs on the of the communication devices 30, 32 of the user.

In addition, for some embodiments, the routing engine is configured to answer incoming calls with a busy signal when one of the communications devices 30, 32 of associated with the VoIP telephone number is in another call. In other embodiments, the routing engine is configured to instead ring (notification including by audio and/or vibration) the communications devices 30, 32 with the communications device 30, 32 is in another call providing an indication (by audio or vibration) of a new call.

The cache 82 can be checked for data prior to requesting data from the user data databases 76. In addition, requests can be queued in the queue 84, which can be implemented using Redis or similar technology.

In some embodiments, a non-transitory computer-readable medium (CRM) may be provided integrated with or independent from the system 100. The CRM may include an electronic, magnetic optical or other physical storage device that stores instructions executable by a processor. In particular, the instructions may cause the processor to perform the functions described herein. For example, the communications device 30, 32 may include a memory including the CRM having instructions recorded thereon, a communications interface, and a processor configured to perform the functions described herein via execution of the instructions. In other examples, the communications routing system 42 may include server having a memory including the CRM having instructions recorded thereon, a communications interface, and a processor configured to perform the functions described herein via execution of the instructions.

Figure 3:
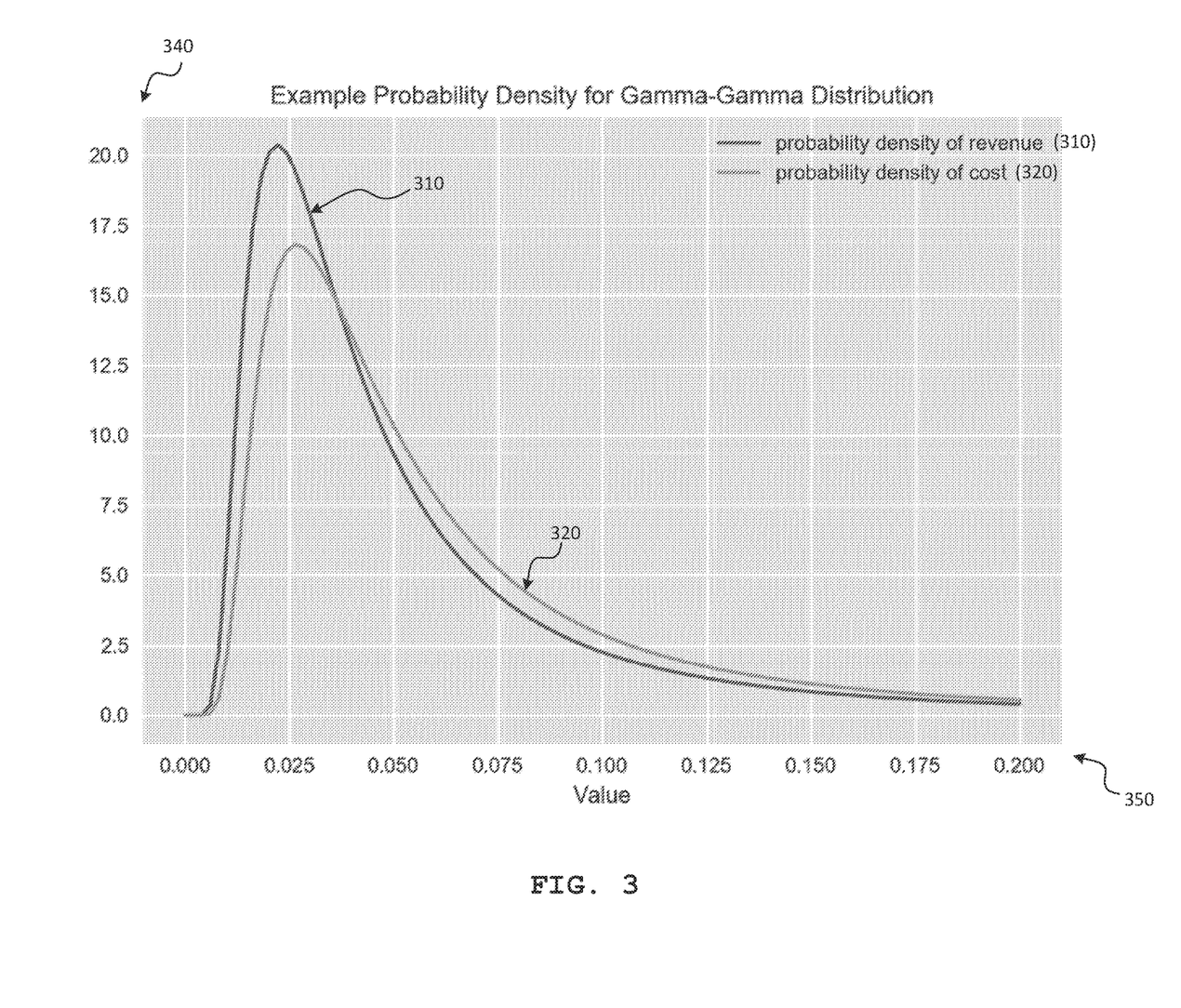
FIG. 3 is a diagram of example probability densities of gamma-gamma distributions for cost and revenue of communications services in the system of FIG. 1.

FIG. 3 shows a diagram of example probability densities for a gamma-gamma revenue distribution 310 and a gamma-gamma cost distribution 320. In particular, the distributions 310 and 320 plot the probability density 340 (y-axis) in inverse dollar units against the monetary value 350 (x-axis). The revenue distribution 310 represents an approximation of the relative likelihood that revenue per day is equal to a particular dollar value. Similarly, the cost distribution 320 represents an approximation of the relative likelihood that cost per day is equal to a particular dollar value. For example, the probability density of the probability density of having $0.10 per day of revenue is 2.5 per dollar. The gamma-gamma distributions 310 and 320 are also known as compound gamma distributions and represent how the respective revenue and cost values for a group of users or user accounts may be distributed. In particular, the use of gamma-gamma distributions for estimating consumer purchase values are described in "The Gamma-Gamma Model of Monetary Value" by Peter S. Fader (www.petefader.com) and Bruce G. S. Hardie (www.brucehardie.com), February 2013, Semantic Scholar. The gamma-gamma distributions are derived from compounding a gamma distribution with another gamma distribution where the rate parameter of the first gamma distribution is modeled by the second gamma distribution. In this embodiment, a user's transactions are modeled using a gamma distribution and the rate of said distribution with another gamma distribution. Three assumptions are made: (1) the monetary value of a user's given transaction varies randomly around their average transaction value; (2) the average transaction values vary across customers but do not vary over time for any given user; and (3) the distribution of average transaction values across users is independent of the transaction process. These assumptions are the basis of a model that conditions its updates on individual user transaction behavior. To be specific, the model will update itself to capture each individual user's transaction behavior based on the user's average value and frequency of transactions.

The gamma-gamma distributions 310 and 320 may be used to approximate the cost and revenue in the communications system 100. In particular, the revenue distribution 310 approximates an average revenue per user account generated based on advertisements presented to the user account in a given period of time (e.g. per day). The cost distribution 320 approximates an average cost per user account to service the user account in a given period of time. In particular, servicing the user account may include supporting communications events, such as telephone calls, text messages, and the like. The period of time may vary and may be, for example, a week, a month, a portion of a day, or the like.

Figure 4:
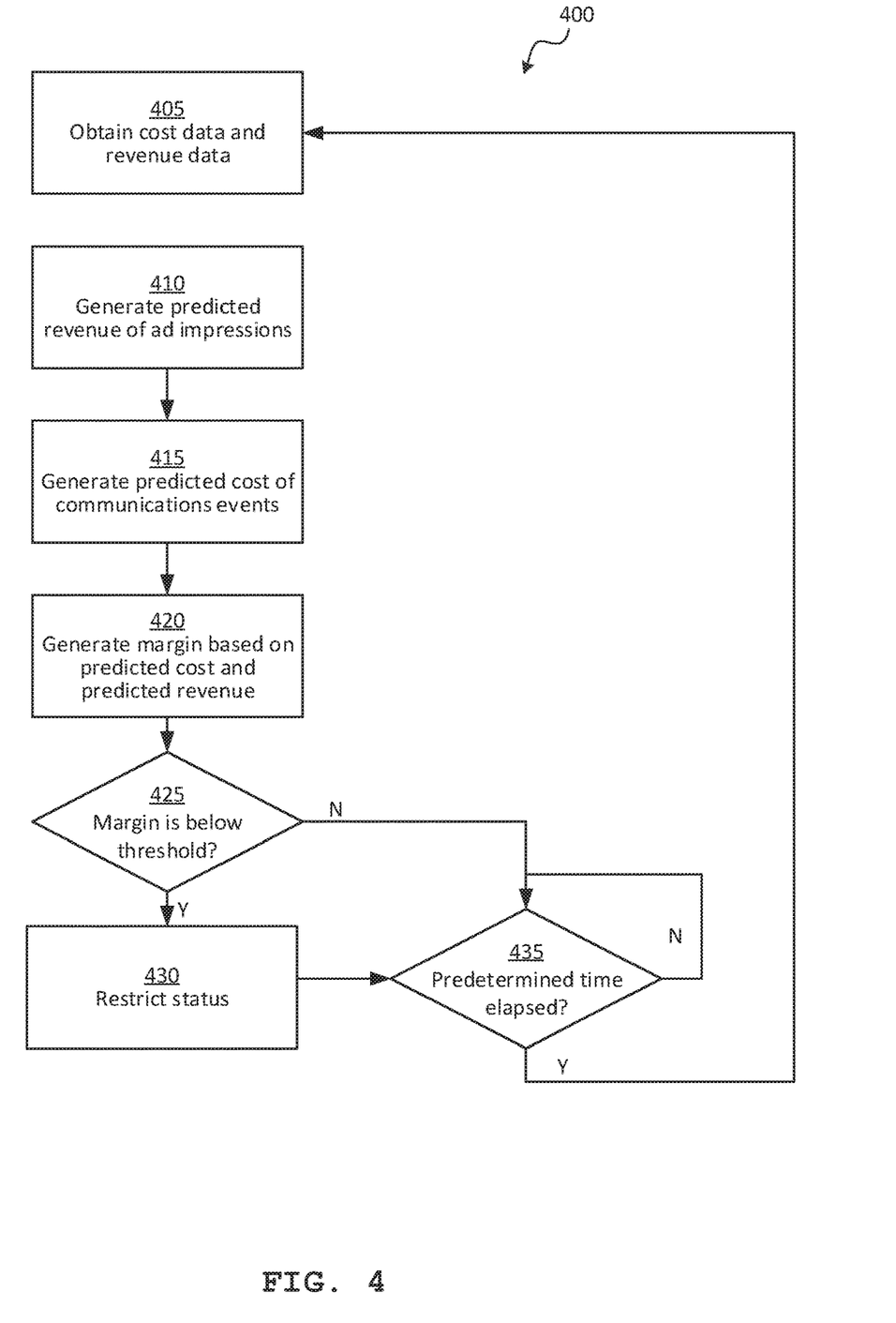
FIG. 4 is a flowchart of a method of managing communications events in the communications system of FIG. 1.

FIG. 4 shows a flow diagram of an example method 400 of utilizing gamma-gamma distribution analysis to manage communications events. The method 400 will be described in conjunction with its performance in the system 100, and in particular, as performed by the communications routing system 42. In other examples, the method 400 may be performed by other suitable systems.

At block 405, the communications routing system 42, and in particular, the prediction engine, is configured to obtain cost data and revenue data. The prediction engine may obtain the cost data from the user data databases 76. In particular, when a user initiates a telephone call, receives a text message, or otherwise incurs a communications event in association with the user's user account, the servers 72 of the communications routing system 42 may generate cost data for the event, which is stored in the user data databases 76. The cost data may include a user identifier (e.g. username, user account identifier), time data (e.g. time at which the call was initiated, or the text message received), duration data, and a cost of the communications event based on rate data. The rate data may be an average of cost for each type of event generated at monthly intervals by aggregating all of the event cost data. In other examples, other methods of obtaining cost data, including fixing arbitrary amounts, may be employed.

The prediction engine may obtain the revenue data from the advertisement server 95. In particular, when an advertisement from the ad server 95 is displayed at a communication device 30, 32, a client program on the communications device 30, 32 may generate revenue data stored in the user data databases 76. In other examples, the revenue data may be stored on another server (not shown). The revenue data may include a user identifier (e.g. username, user account identifier), time data (e.g. time at which the ad was presented), and revenue associated with the ad impression. The revenue may be obtained from the ad server 95 based on the particular ad impression. In other examples, revenue from the advertisements may be determined using other methods, including, but not limited to, an average monthly ad revenue or fixed arbitrary amounts.

In some examples, the cost data and the revenue data may be aggregated to produce core data, including, but not limited to: a number of days on which the user made at least one call (or otherwise incurred a communications event), the number of days on which the user was presented with at least one ad impression, the number of days the user has an open user account, the total cost for the user per number of days on which the user made at least one call, and the total revenue for the user per number of days on which the user made at least one call.

At block 410, the prediction engine generates a predicted revenue from ad impressions for a given user based on revenue data and the gamma-gamma revenue distribution 310. In particular, the prediction engine first determines the optimal gamma-gamma revenue model which best describes how average daily ad revenue is distributed across all users. The parameters (p, q, γ) of the optimal gamma-gamma cost model may be estimated via the Maximum Likelihood Estimation (MLE) method. The log-likelihood function to be maximized is given in Fader's paper:

$$LL(p, q, \gamma \mid x_i, \bar{z}_i) = \sum_{i=0}^{n} \ln\left( \frac{1}{\bar{z}_i B(px_i, q)} \left( \frac{\gamma}{\gamma + x_i \bar{z}_i} \right)^q \left( \frac{x_i \bar{z}_i}{\gamma + x_i \bar{z}_i} \right)^{px_i} \right)$$

where $\bar{z}_i$ is the average daily ad revenue for user i, and $x_i$ is the number of days on which user i saw at least one ad impression. With parameters (p, q, γ), the gamma-gamma revenue model for all users then has the probability density function $$GG(\bar{z} \mid p, q, \gamma; x) = \frac{1}{\bar{z}B(px, q)} \left(\frac{\gamma}{\gamma + x\bar{z}}\right)^q \left(\frac{x\bar{z}}{\gamma + x\bar{z}}\right)^{px}$$

The maximum log likelihood estimation method collects the number of days on which a revenue event occurs $x_i$ and the average daily revenue $\bar{z}_i$ from every user i=1, 2, 3, ... n, and finds (p, q, γ) such that the sum of log probabilities (output of the function LL) is maximized. This will yield the parameters (p, q, γ) from a given sample $((x_1,\bar{z}_1), (x_2,\bar{z}_2), (x_3,\bar{z}_3), \ldots (x_n,\bar{z}_n))$ which is considered as a proxy for the entire user base.

The predictive distribution of the gamma gamma revenue model for a single user is the inverse gamma distribution based on the optimal parameters (p, q, γ), the number of days on which the given user account was presented with an advertisement and the average daily advertisement revenue for the user account on said days. The probability density function of said inverse gamma distribution is expressed as follows:

$$f(Z_i \mid p, q, \gamma; x_i, \bar{z}_i) = \frac{(p(\gamma + x_i\bar{z}_i))^{px_i+q}}{\Gamma(px_i + q)} z_i^{-(px_i+q)-1} e^{\frac{p(\gamma+x_i\bar{z}_i)}{z_i}}$$

Here $Z_i$ stands for the true average ad revenue per day for the single user i, and its distribution is inverse gamma with shape $px_i+q$ and scale $p(\gamma+x_i\bar{z}_i)$. The optimal parameters (p, q, γ) fitted from maximum likelihood estimation are plugged into this equation along with the individual $x_i$ and $z_i$ to get the distribution of the true average ad revenue per day for the given user i.

In some examples, the prediction engine may further generate confidence intervals for the gamma-gamma revenue distribution. In particular, the upper revenue confidence bound of true average ad revenue per day for user i, based on the user's number of days on which the user saw at least one ad impression and the observed average ad revenue over said number of days, the user's true average ad revenue per day (i.e. the posterior distribution) is distributed as inverse gamma with shape $px_i+q$ and scale $p(\gamma+x_i\bar{z}_i)$: E(ad revenue for user i|$x_i,\bar{z}_i$)~InvGamma($px_i+q$, $p\gamma+x_i\bar{z}_i$) where $\bar{z}_i$ is the observed average daily ad revenue for user i, and $x_i$ is the number of days on which user i saw at least one ad impression. The upper revenue confidence bound represents a revenue threshold percentile of the inverse gamma distribution with shape $px_i+q$ and scale $p(\gamma+x_i\bar{z}_i)$. For example, the upper confidence bound may be the $95^{th}$ percentile of the inverse gamma distribution. This may be estimated with numerical methods (commonly available in numerical libraries e.g. MATLAB/Scipy). Thus, the upper confidence bound represents the upper bound below which the actual average revenue for user i resides 95% of the time. In other examples, other percentiles may be used, such as the $97.5^{th}$ percentile, or the $99.5^{th}$ percentile.

At block 415, the prediction engine generates a predicted cost of communications events for a given user based on the cost data and the gamma-gamma cost distribution 320. In particular, the prediction engine first determines the optimal gamma-gamma cost distribution 320, which best describes how average daily calling costs are distributed across all users. The parameters (p, q, γ) of the optimal gamma-gamma cost model are estimated via Maximum Likelihood (MLE) method where the log-likelihood function is given by:

$$LL(p, q, \gamma \mid x_i, \bar{y}_i) = \sum_{i=0}^{n} \ln\left(\frac{1}{\bar{y}_i B(px_i, q)} \left(\frac{\gamma}{\gamma + x_i\bar{y}_i}\right)^q \left(\frac{x_i\bar{y}_i}{\gamma + x_i\bar{y}_i}\right)^{px_i}\right)$$

where is the average daily calling cost for user i, and $x_i$ is the number of days on which user i made at least one call. With parameters (p, q, γ), the gamma-gamma cost model for all users then has the following probability density function:

$$GG(\bar{y} \mid p, q, \gamma; x) = \frac{1}{\bar{y}B(px, q)} \left(\frac{\gamma}{\gamma + x\bar{y}}\right)^q \left(\frac{x\bar{y}}{\gamma + x\bar{y}}\right)^{px}$$

The maximum log likelihood estimation method collects the number of days on which a communications event occurs $x_i$ and the average daily cost of communications events $\bar{y}_i$ from every user i=1, 2, 3, ... n, and finds (p, q, γ) such that the sum of log probabilities (output of the function LL) is maximized. This will yield the optimal (p, q, γ) from a given sample $((x_1,\bar{y}_1), (x_2,\bar{y}_2), (x_3,\bar{y}_3), \ldots (x_n,\bar{y}_n))$, which can be considered a proxy for the entire user base.

The predictive distribution of the gamma gamma cost model for a single user is the inverse gamma distribution based on the fitted parameters (p, q, γ), the number of days on which the given user made at least one call and his/her average cost over said number of days. The probability density function of said inverse gamma distribution is expressed as follows:

$$f(Y_i \mid p, q, \gamma; x_i, \bar{y}_i) = \frac{(p(\gamma + x_i\bar{y}_i))^{px_i+q}}{\Gamma(px_i + q)} y_i^{-(px_i+q)-1} e^{\frac{p(\gamma+x_i\bar{y}_i)}{y_i}}$$

Here $Y_i$ stands for the true average cost per day for the single user i, and its distribution is inverse gamma with shape $px_i+q$ and scale $p(\gamma+x_i\bar{y}_i)$. The parameters (p, q, γ) fitted from maximum likelihood estimation are plugged into this equation along with the individual $x_i$ and $\bar{y}_i$ to get the distribution of the true average cost per day for the given user i.

In some examples, the prediction engine may further generate confidence intervals for the gamma-gamma cost distribution. In particular, the lower cost confidence bound of true average cost per day for user i, based on the user's number of days on which the user incurred at least one communications event and the observed average cost for communications services over said number of days, the user's true average cost per day (i.e. the posterior distribution) is distributed as inverse gamma with shape $px_i+q$ and scale $p(\gamma+x_i\bar{y}_i)$: E(cost for user i|$x_i,\bar{y}_i$)~InvGamma($px_i+q$, $p\gamma+x_i\bar{y}_i$) where $\bar{y}_i$ is the observed average daily cost for user i, and $x_i$ is the number of days on which user i saw incurred at least one communications event. The lower cost confidence bound represents a revenue threshold percentile of the inverse gamma distribution with shape $px_i+q$ and scale $p(\gamma+x_i\bar{y}_i)$. For example, the lower cost confidence bound may be the $5^{th}$ percentile of the inverse gamma distribution. This may be estimated with numerical methods (commonly available in numerical libraries e.g. MATLAB/Scipy). Thus, the lower cost confidence bound represents the bound below which the actual average cost for user i resides 5% of the time. That is, it represents the lower bound above which the actual average cost for the user i resides 95% of the time. In other examples, other percentiles may be used, such as the 2.5$^{th}$ percentile, or the 0.5$^{th}$ percentile.

In some examples, the predicted revenue and the predicted cost generated at blocks 410 and 415 may be stored in the user data database 76 or other suitable data warehouse.

Figure 5:
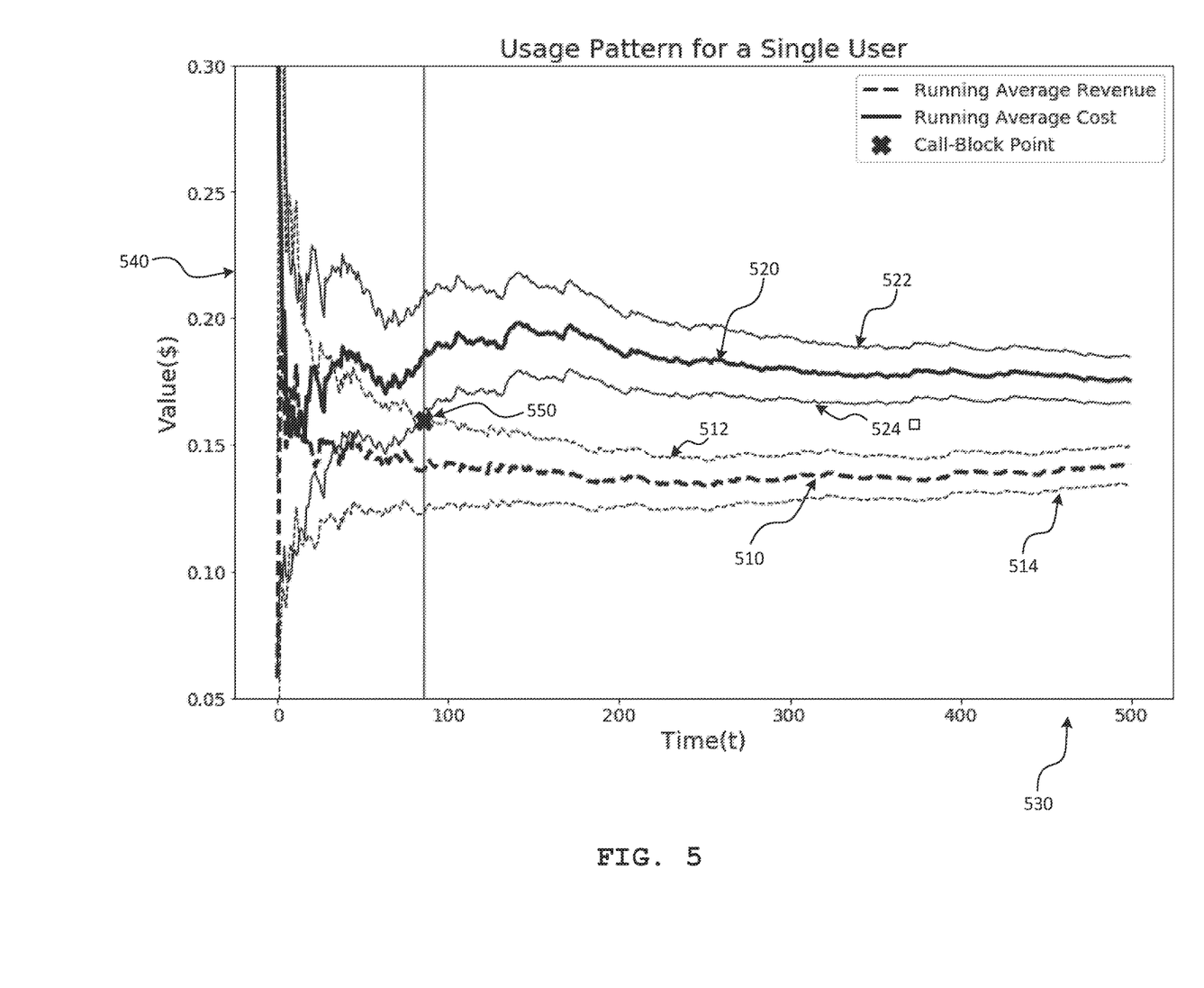
FIG. 5 is a diagram of revenue and cost plots with corresponding confidence bounds as derived from the probability densities of FIG. 3.

Referring now to FIG. 5, an example revenue plot 510 and an example cost plot 520 are depicted. The x-axis 530 represents time from day 0 (zero) to 500, where day 0 is the day on which the user is first tracked. The y-axis 540 represents the dollar amount per day for the user. The revenue plot 510 represents a running average revenue per day (i.e. earned via ad impressions). The revenue plot 510 also includes an upper revenue confidence bound 512 and a lower revenue confidence bound 514, which represent, respectively, the 95$^{th}$ and the 5$^{th}$ percentiles of the predictive distribution derived from the revenue distribution 310. The cost plot 520 represents a running average cost per day of servicing communications events for the user. The cost plot 520 also includes an upper cost confidence bound 522 and a lower cost confidence bound 524, which represent, respectively, the 95$^{th}$ and the 5$^{th}$ percentiles of the predictive distribution derived from the cost distribution 320. In other examples, other bounds of probabilities (i.e. other percentiles), may also be used.

Returning to FIG. 4, at block 420, the communications routing system 42, and in particular the prediction engine, is configured to determine a margin based on the predicted revenue and the predicted cost. In particular, the margin bay be defined as the difference between the upper revenue confidence bound and the lower cost confidence bound. The margin computed at block 420 may be stored in the user data databases 76 or another suitable database.

In particular, this enables a statistical approach to modeling the profitability margin for every user, which is defined as the difference between operating costs arising from servicing a user and revenue generated by a user. The running average revenue and cost plots 510 and 520 are generated from the daily running average revenue and cost for each user. Separate plots 510 and 520 (herein also known as models) are generated for revenue and cost, and the confidence bands of daily revenue and cost are estimated for every user.

Population parameters for rolling average revenue and cost may be generated and used to construct individual base estimators for all users. Each user's base estimator is updated with the user's transaction history (i.e. including revenue from ad impressions and cost of servicing communications events). Over time, as more data is gathered from each user, the confidence band narrows. This process may be visualized in FIG. 5, where the given user's revenue and cost plots 510 and 520 converge around their running averages.

Further, the plots 510 and 520 have an intersection point 550 at time (t) (in the present example, at day 85) which represents the time at which the lower cost confidence bound 524 is higher than the upper revenue confidence bound 512. That is, the intersection point 550 represents the time at which the margin computed at block 420 of the method 400 is negative.

Returning to FIG. 4, at block 425, the communications routing system 42 determines whether the margin computed at block 420 is below a margin threshold. For example, the margin threshold may be zero (i.e. a break-even point), and accordingly, the margin may be determined to be below the margin threshold when the predicted cost is higher than the predicted revenue. In other examples, the margin threshold may represent a minimum profitability margin above which a communications service provider desires to stay.

If, at block 425, the communications routing system 42 determines that the margin for a given user account is below the margin threshold, the method 400 proceeds to block 430 to restrict the status of the user account. For example, the communications routing system 42 may store an indication of the restricted status in the user data databases 76. The communications routing system 42 may then apply measures to manage the communications events for the user account. For example, the communications routing system 42 may restrict communications events permitted for the user account (e.g. by blocking the user account from accessing the communications system 100), increase the number of ad impressions presented at the communications devices 30, 32 associated with the user account, limit features of the communications services available to the user, increase the length of advertisements shown to the user, or other suitable measures to increase the profitability margin (i.e. by increasing revenue or decreasing cost).

At block 435, if a predetermined interval of time has elapsed, the method 400 may repeat. For example, the status may be generated every hour, every day, or the like. In particular, the method 400 may be used to updated the predicted revenue, the predicted cost, and the calculated margins.

In some examples, the status of each user account may be accessed by the communications routing system 42 whenever the user tries to make a communications event (e.g. a telephone call) and manage the communications event (e.g. blocking the call or presenting the user with further ad impressions prior to allowing the call) as applicable. In other examples, the communications routing system 42 may retrieve the most recently calculated margin. If the margin for the user is below the margin threshold, the communications routing system 42 manages the communications event accordingly.

While the foregoing provides certain non-limiting example implementations, it should be understood that combinations, subsets, and variations of the foregoing are contemplated. The monopoly sought is defined by the claims.

What is claimed is:

1. A communications routing system comprising:
a routing engine configured to manage Voice over Internet Protocol (VoIP) communications events between a plurality of communications devices using respective VoIP telephone numbers;
an account database storing a plurality of unique associations between user accounts of users and the VoIP telephone numbers;
a cost database storing a cost of the communications events for the user accounts;
a revenue database storing a revenue of presented advertisements associated with the user accounts;
a prediction engine configured to, for each of the user accounts:
generate a predicted cost of the communications events using a gamma-gamma cost model;
generate a predicted revenue of the presented advertisements using a gamma-gamma revenue model;
determine an upper revenue confidence bound representing a revenue threshold percentile of an inverse gamma revenue distribution;
determine a lower cost confidence bound representing a cost threshold percentile of an inverse gamma cost distribution;

generate a margin based on the predicted cost and the predicted revenue and a difference between the upper revenue confidence bound and the lower cost confidence bound; and when the margin for a given user account is below a margin threshold, restrict a status associated with the given user account.

2. The communications routing system of claim 1, wherein, to generate the predicted revenue for the given user account, the prediction engine is configured to:

determine optimal parameters of the gamma-gamma revenue model based on a maximum likelihood estimation; and determine a predictive revenue distribution for the given user account using an inverse gamma revenue distribution based on (i) the optimal parameters, (ii) an average daily advertisement revenue for the given user account and (iii) a number of days on which the given user account was presented with an advertisement.

3. The communications routing system of claim 1, wherein, to generate the predicted cost for the given user account, the prediction engine is configured to:

determine optimal parameters of the gamma-gamma cost model based on a maximum likelihood estimation; and determine a predictive cost distribution for the given user using an inverse gamma distribution based on (i) the optimal parameters, (ii) an average daily cost of communications events for the given user account and (iii) a number of days on which a communications event occurs for given user account.

4. The communications routing system of claim 1, wherein, in response to restricting the status of the given user account the routing engine is configured to:

block communications events for the given user account;

limit features of communications services available for the given user account;

increase a length of advertisements presented to the given user account; or increase a number of advertisements presented to the given user account.

5. The communications routing system of claim 1, wherein the revenue threshold percentile is a $95^{th}$ percentile.

6. The communications routing system of claim 1, wherein the cost threshold percentile is a $5^{th}$ percentile.

7. The communications routing system of claim 1, wherein the prediction engine is configured to update the account database to include an indication of the restricted status of the given user account.

8. A method comprising:

storing a plurality of unique associations between user accounts of users and VoIP telephone numbers;

storing a cost of communications events for the user accounts;

storing a revenue of presented advertisements associated with the user accounts;

for each of the user accounts:

generating a predicted cost of the communications events using a gamma-gamma cost model;

generating a predicted revenue of the presented advertisements using a gamma-gamma revenue model;

determining an upper revenue confidence bound representing a revenue threshold percentile of an inverse gamma revenue distribution;

determining a lower cost confidence bound representing a cost threshold percentile of an inverse gamma cost distribution;

generating a margin based on the predicted cost and the predicted revenue and a difference between the upper revenue confidence bound and the lower cost confidence bound; and when the margin for a given user account is below a margin threshold, restricting a status associated with the given user account.

9. The method of claim 8, wherein generating the predicted revenue for the given user account comprises:

determining optimal parameters of the gamma-gamma revenue model based on a maximum likelihood estimation; and determining a predictive revenue distribution for the given user account using an inverse gamma revenue distribution based on (i) the optimal parameters, (ii) an average daily advertisement revenue for the given user account and (iii) a number of days on which the given user account was presented with an advertisement.

10. The method of claim 8, wherein generating the predicted cost for the given user account comprises:

determining optimal parameters of the gamma-gamma cost model based on a maximum likelihood estimation; and determining a predictive cost distribution for the given user using an inverse gamma distribution based on (i) the optimal parameters, (ii) an average daily cost of communications events for the given user account and (iii) a number of days on which a communications event occurs for given user account.

11. The method of claim 8, further comprising, in response to restricting the status of the given user account:

blocking communications events for the given user account;

limiting features of communications services available for the given user account;

increasing a length of advertisements presented to the given user account; or increasing a number of advertisements presented to the given user account.

12. The method of claim 8, wherein the revenue threshold percentile is a $95^{th}$ percentile.

13. The method of claim 8, wherein the cost threshold percentile is a $5^{th}$ percentile.

14. The method of claim 8, further comprising updating an account database to include an indication of the restricted status of the given user account.

* * * * *

UNITED STATES PATENT AND TRADEMARK OFFICE
CERTIFICATE OF CORRECTION

PATENT NO. : 11,144,851 B2
APPLICATION NO. : 16/539234
DATED : October 12, 2021
INVENTOR(S) : U Kong Wong et al.

It is certified that error appears in the above-identified patent and that said Letters Patent is hereby corrected as shown below:

In the Specification

Column 3, Line 50:
"... restrictive measure ..." should read - ... restrictive measures ... -

Column 2, Line 32:
"...increase a length of..." should read - ... increase the length of... -

Column 2, Line 33:
"...increase a length of..." should read - ... increase the length of... -

Column 4, Line 65:
"...(ISP) or the similar entity..." should read - ... (ISP) or a similar entity... -

Column 6, Line 5:
"... be pace to and from..." should read - ... to be paced to and from... -

Column 8, Line 6:
"... requiring a user log in..." should read - ... requiring a user login ... -

Column 10, Line 29:
"... such as web sites connected..." should read - ... such as websites connected ... -

Column 10, Line 56:
"...data channel then the WLAN..." should read - ... data channel than the WLAN ... -

Column 12, Line 12:
"...amount bandwidth used..." should read - ... amount of bandwidth used ... -

Signed and Sealed this
Third Day of May, 2022

*Katherine Kelly Vidal*
Katherine Kelly Vidal
*Director of the United States Patent and Trademark Office*

Column 12, Line 49:
"...30/32 of associated with the..." should read - ... 30, 32 is associated with the... -

Column 13, Line 20:
"... the probability density of the probability density of..." should read - ... the probability density of ... -

Column 15, Line 15:
"... for a gamma gamma ..." should read - ... for a gamma-gamma ... -

Column 16, Line 6:
"... where is the average daily..." should read - ... where $\bar{y_i}$ is the average daily ... -

Column 16, Line 24:
"distribution of gamma gamma ..." should read - ... distribution of gamma-gamma ... -